US005274902A

United States Patent [19]

Rowley

[11] Patent Number: 5,274,902

[45] Date of Patent: Jan. 4, 1994

[54] DEVICE AND METHOD FOR JOINING BOARDS ANGULARLY EDGE-TO-EDGE WITHOUT MITERING

[75] Inventor: John H. Rowley, Gastonia, N.C.

[73] Assignee: R. H. Rowley Co., Gastonia, N.C.

[21] Appl. No.: 27,251

[22] Filed: Mar. 5, 1993

[51] Int. Cl.[5] ........................ B23P 11/02; E04F 21/00

[52] U.S. Cl. .................................... 29/525.1; 16/357; 29/407; 29/434; 33/194; 33/534; 144/329; 144/353

[58] Field of Search ......................... 33/194, 534, 538; 16/357; 144/329, 353; 29/407, 434, 525.1

[56] References Cited

U.S. PATENT DOCUMENTS

| | | | |
|---|---|---|---|
| 116,688 | 7/1871 | Covert | 16/357 |
| 175,040 | 3/1876 | Crane | 16/357 |
| 528,719 | 11/1894 | Fuchs | 16/357 |
| 1,540,991 | 6/1925 | Holmgren | 33/194 |
| 4,461,092 | 7/1984 | Hore | 33/534 |
| 4,535,542 | 8/1985 | Liu et al. | 33/534 |
| 4,945,649 | 8/1990 | Parker | 33/534 |
| 5,111,802 | 5/1992 | Lin | 16/357 X |

OTHER PUBLICATIONS

Advertisement, undated, of Drapery Boutique, Inc., P.O. Box 478, Haw River, N.C., entitled "The Bay Bridge".

*Primary Examiner*—W. Donald Bray

*Attorney, Agent, or Firm*—Shefte, Pinckney & Sawyer

[57] ABSTRACT

A device and method for angularly joining elongate boards end-to-end or edge-to-edge without mitering utilizes a plate for pivotal connection in overlying relation to square-cut abutted board ends to enable the board ends to be subsequently pivoted into their desired angular relationship, whereupon the connecting plate may be rigidly secured to the boards to fix them together.

8 Claims, 3 Drawing Sheets

DEVICE AND METHOD FOR JOINING BOARDS ANGULARLY EDGE-TO-EDGE WITHOUT MITERING

BACKGROUND OF THE INVENTION

The present invention relates broadly to the joinder of boards edge-to-edge and, more particularly, to a device by which such joinder can be accomplished to orient the boards angularly with respect to on another without mitering.

In various woodworking and carpentry operations, it is necessary or desirable to abuttingly join the edges of boards at an angle with respect to one another. Conventionally, such joinder is performed by angularly cutting the edge of one or both boards to facilitate edge abutment of the boards at the precise angle required, a technique which is commonly referred to as mitering.

In many such operations, mitering is desirable and preferable to provide an aesthetically pleasing joint between the board edges. However, in other installations, mitering is unnecessary for aesthetic purposes but is nevertheless performed in order to achieve the desired angular relationship between the joined boards.

One such use of mitered joints is in the installation of dust boards within the upper confines of a bay window in a home or other similar building structure to minimize collection of airborne dust and other debris on curtains and like window treatments to be installed within the bay window beneath the dust boards. In such an installation, the dust boards are largely out of view to the normal casual observer once curtains have been installed within the bay window. Nevertheless, because the dimensions and angular orientation of the sides and front of bay window structures may vary considerably, such dust boards must be specially fabricated and cut to the dimensions of each individual bay window, conventionally requiring on-site fabrication of the dust boards, commonly performed by measuring and cutting individual boards to the particular dimensions of each side and front of the bay window and then cutting and joining the board ends by mitering to conform to the specific angle or angles of the bay window. This process is time consuming, labor-intensive and, in turn, relatively expensive, particularly inasmuch as the appearance of the dust boards is of little consequence.

SUMMARY OF THE INVENTION

It is accordingly an object of the present invention to provide a novel device for use in joining a pair of boards edge-to-edge at an angle with respect to one another without mitered cutting of the adjoining edges of the boards, which will greatly simplify and reduce the required time and expense of fabrication and installation of bay window dust boards as well as other carpentry and like fabrications wherein the appearance of the joint between the boards is relatively unimportant.

Briefly summarized, the device of the present invention comprises a plate for affixation in overlying relation to the respective board edges when abutted. The plate has a reference indicia for disposition at the abutted board edges. An opening is formed in the plate adjacent the reference indicia for receipt of a first fastener affixed to one of the abutted boards for attaching the plate and the one board pivotably with respect to one another. A first slot is formed in the plate in relative disposition to the opening for receipt of a second fastener affixed to the one board for defining a predetermined maximum range of relative pivoting movement of the one board and a plate. A second slot is also formed in the plate in relative disposition to the reference indicia for receipt of a third fastener affixed to the other of the abutted boards for attaching the plate to the other board and for defining a predetermined maximum range of relative pivoting movement of the other board and the plate.

The above-described device thus provides a novel method for joining the boards by initially abutting the respective edges of the boards, e.g., flush with one another, and then positioning the connecting plate in overlying relation to the abutted board edges with the reference indicia disposed at the abutment location, the fastener receipt opening and the first slot overlying the one board, and the second slot overlying the other board. The first fastener is then affixed to the one board through the fastener receipt opening for attaching the plate and the one board pivotably with respect to one another and the second fastener is affixed to the one board through the first slot. The third fastener is likewise affixed to the other board through the second slot. With the connecting plate thusly attached to the boards by the fasteners, the abutted boards may be pivoted with respect to one another and with respect to the plate into a desired angular disposition to each other, after which the fasteners can be secured to clamp the plate to the pivoted boards to fix them in their desired angular disposition.

In the preferred embodiment of the present invention, the reference indicia is formed as a notch in one edge of the plate, the first slot is formed to extend approximately 90° and the second slot is formed to extend slightly less than 90°, preferably nearly contiguous to the first slot. During the installation process, the second fastener is preferably located initially at the end of the first slot most closely adjacent the abutted board edges and, likewise, the third fastener is preferably located at the end of the second slot most closely adjacent the abutted board edges, thus permitting the boards to be selectively pivoted through a maximum range of angles with respect to one another.

DESCRIPTION OF THE PREFERRED EMBODIMENT

Figure 1:
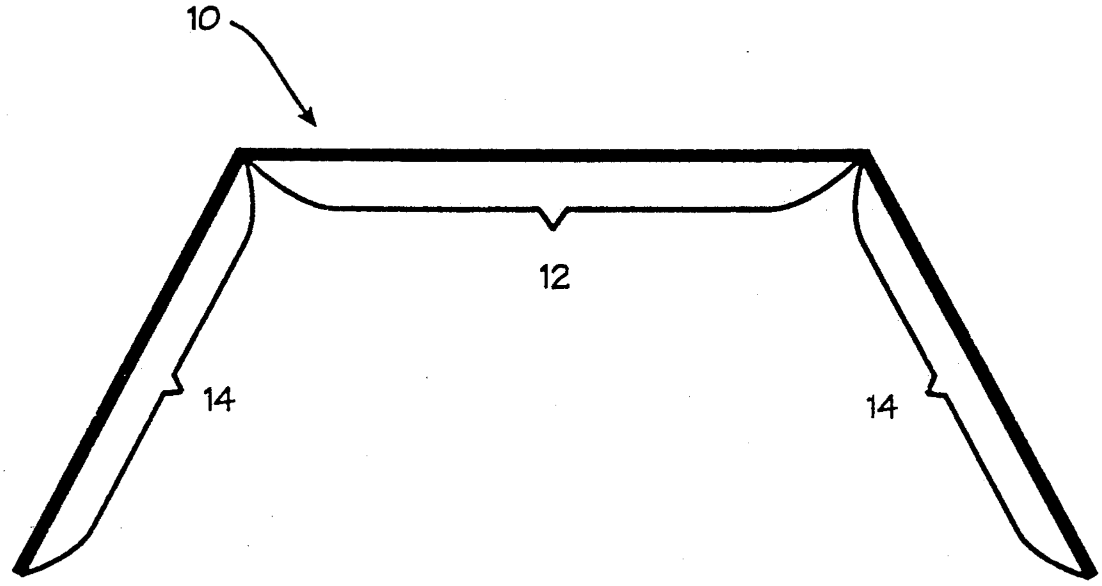
FIG. 1 is a schematic top view depicting diagrammatically the front and sides of a conventional form of bay window structure.
Figure 2:
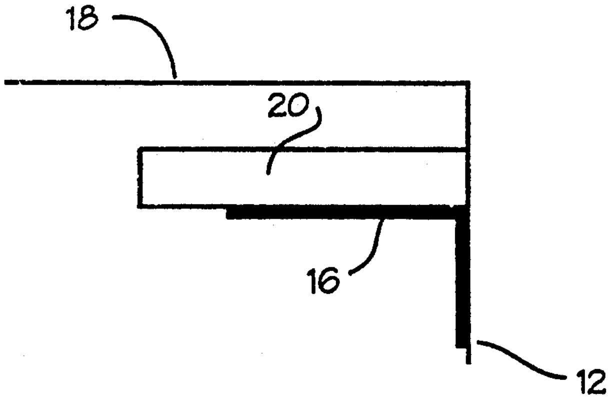
FIG. 2 is a similarly schematic diagram in vertical cross-section of the installation of a dust board within the bay window structure of FIG. 1.

Referring now to the accompanying drawings and initially to FIGS. 1 and 2, a typical three-sided conventional bay window structure is diagrammatically depicted in FIG. 1 generally at 10 and basically includes a front wall 12 and a pair of side walls 14 extending angularly from the opposite ends of the front wall 12 to support front and side windows (not shown) within the respective walls 12, 14. Above the windows, a series of angle brackets 16 are affixed at spacings along the front and side walls 12, 14 at a short spacing beneath the ceiling 18 of the bay window structure 10 to support front and side dust boards 20, 21 (only one of which is shown at 20 in FIG. 2) to deflect and prevent dust from collecting on curtains or other window treatments installed within the bay window. As mentioned, the dust boards are typically joined by mitering their respective ends in conformity to the angular relationship between the front and side walls 12, 14 of the bay window structure 10. Since the foregoing is substantially conventional, further description of the bay window structure 10 and conventional dust boards is believed to be unnecessary.

Figure 3:
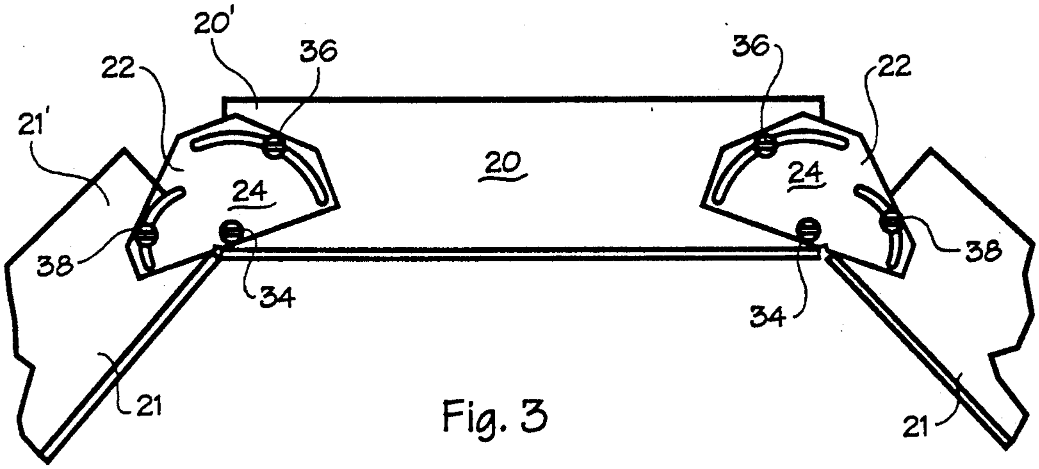
FIG. 3 is a top plan view of a dust board structure for the bay window of FIGS. 1 and 2, fabricated using the device and method of the present invention.
Figure 4:
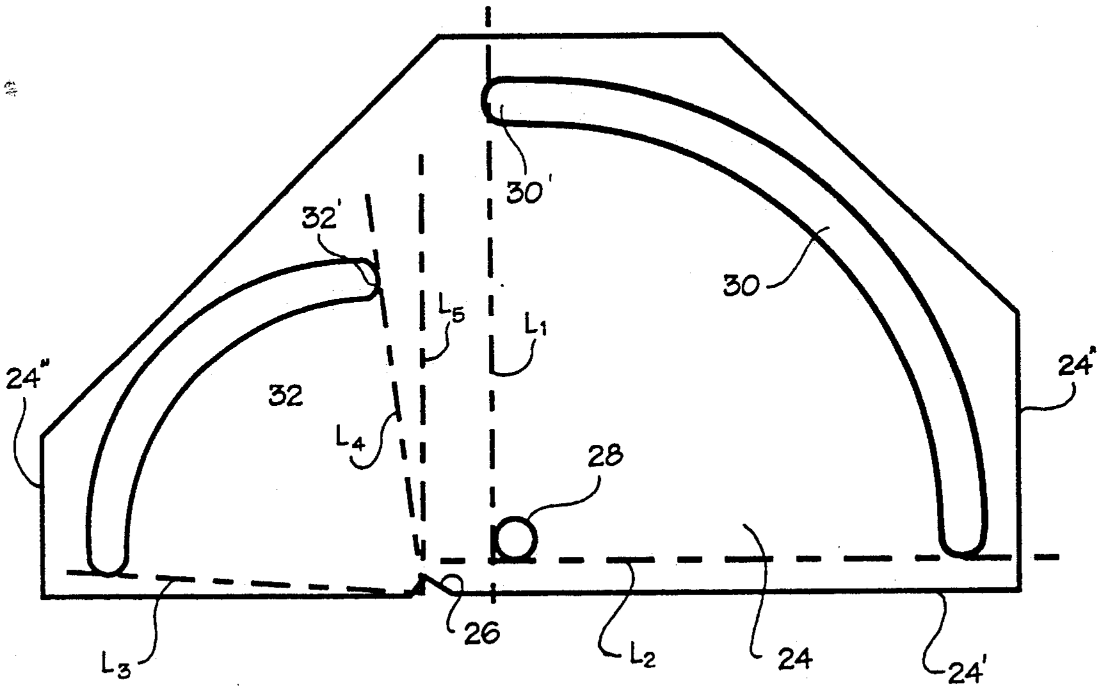
FIG. 4 is a plan view of the connecting plate of the device of the present invention.

Referring now to FIGS. 3 and 4, the present invention provides a device in the form of a connecting plate assembly, generally indicated at 22, by which the dust boards 20, 21 may be selectively joined end-to-end in substantially any desired angular relationship to one another without mitered cutting of the adjoining ends of the boards. For this purpose, the device of the present invention provides a plate member 24 for affixation in overlying relation to the board ends to secure them in the desired angular relationship, by the method of the present invention which is more fully explained hereinafter.

As best seen in FIG. 4, the plate 24 is formed as a flat planar member in the shape of a truncated rectangle providing the plate 24 with a single fully lengthwise-extending edge 24'. A reference notch 26 is formed intermediately along the lengthwise edge 24' of the plate 24 and a circular hole 28 is formed through the plate 24 adjacent the lengthwise edge 24' at a short spacing from the reference notch 26. A first arcuate slot 30 is formed through the plate 24 concentrically about the hole 28 and spans an arc of substantially 90° between imaginary lines $L_1$, $L_2$ extending tangentially to the hole 28 and perpendicularly to the lengthwise edge 24' and the opposite widthwise edges 24" of the plate member 24, whereby the slot 30 is situated on the plate 24 entirely to one lengthwise side of the notch 26. Similarly, a second arcuate slot 32 is formed through the plate 24 concentrically about the reference notch 26, to be entirely to the opposite lengthwise side of the notch 26. However, the arcuate extent of the slot 32 is slightly less than 90°, the slot 32 extending between an imaginary line $L_3$ offset approximately 5° from the lengthwise edge 24' of the plate member 24 and an imaginary line $L_4$ offset approximately 7° from a line $L_5$ extending perpendicularly to the lengthwise edge 24' through the center of the notch 26.

Figure 5:
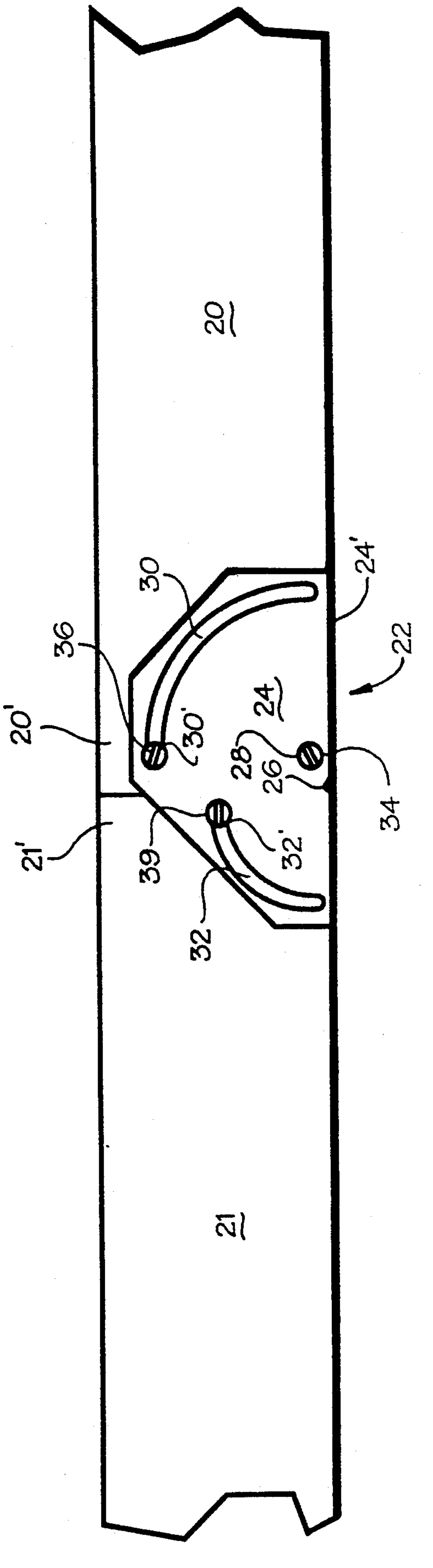
FIG. 5 is a top plan view depicting the installation of the device of FIG. 4 according to the method of the present invention.

Referring now to FIG. 5, the method of joining two dust boards 20, 21 end-to-end using the plate 24 of FIG. 4 is illustrated. Rather than mitering the respective ends 20', 21' of the dust boards 20, 21 which are to be joined, the dust board ends 20', 21' are merely cut perpendicularly with respect to the lengthwise extent of the boards 20, 21 to respective lengths determined from the dimensions of the bay window 10 in which the dust boards are to be installed. Once cut to appropriate lengths, the dust boards 20, 21 are arranged with their respective ends 20', 21' in flush edge abutment as shown in FIG. 5 and the plate 24 is placed in overlying relation to the abutted board ends 20', 21' with the lengthwise edge 24' of the plate 24 extending flush with the lengthwise edges of the dust boards 20, 21 which, upon installation in the bay window 10, will face the interior of the building structure. The reference notch 26 of the plate 24 is situated precisely at the seam between the abutted edges of the dust board ends 20', 21'.

With the plate 24 thusly situated to overlie the abutted board ends 20', 21', a first fastener 34, preferably an appropriate form of screw, is partially driven into one board end 20' through the hole 28 and a second screw or like fastener 36 is driven partially into the same board end 20' through the end 30' of the arcuate slot 30 which is disposed most closely adjacent the abutted board ends 20', 21', all as shown in FIG. 5. At the same time, a third fastener 38 is partially driven into the other board end 21' through the arcuate slot 32 at the end 32, of the slot 32 which is most closely adjacent the abutted board ends 20', 21'. By this manner of affixation of the connecting plate 24 to the board ends 20', 21', the board ends 20', 21' may be pivoted angularly with respect to one another and with respect to the plate 24, within the angular limits of the arcuate slots 30, 32.

A second plate 24 is similarly used to connect the opposite end of the center dust board 20 to the other side dust board 21, following which the three thusly-connected dust boards may be pivoted for placement within the bay window 10 on the angle brackets 16. By pivoting and adjusting of the dust boards 20, 21 with respect to one another, as representatively shown in FIG. 3, the assembly of the dust boards 20, 21 and the plate members 24 may be inserted within the bay window 10 and placed on the angle brackets 16. Thereafter, by fine adjustment of the angular disposition of the dust boards 20, 21 with respect to one another and with respect to the plates 24, the dust boards 20, 21 may be situated to precisely follow the angular relationship of the front and side walls 12, 14 of the bay window. Once so situated, the fasteners 34, 36, 38 may be tightened to clamp the plates 24 to the respective board ends 20', 21' and thereby secure the boards 20, 21 in their desired angular disposition.

As will be readily understood by those persons skilled in the art, installation of dust boards within bay windows utilizing the connecting plate assembly and the method of the present invention will substantially reduce the time, labor and expense of installing dust boards within bay windows without affecting the desired function and performance of the dust boards. Of course, while the device and method of the present invention have herein been described and illustrated with respect to the fabrication and installation of dust boards within bay windows, those persons skilled in the art will readily recognize and understand that the present invention is of much broader applicability and may be used in substantially any situation in which elongate boards are to be joined end-to-end at an angle with respect to one another but the particular situation does not necessitate the mitering of the board ends for such purpose.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A device for use in joining a pair of boards edge-to-edge at an angle with respect to one another without requiring mitered cutting of the adjoining boards, the device comprising a plate for affixation in overlying relation to the boards when abutted edge-to-edge, the plate having a reference indicia for disposition at the abutted board edges, an opening in the plate adjacent the reference indicia for receipt of a first fastener affixed to one of the abutted boards for attaching the plate and the one board pivotably with respect to one another, a first slot in relative disposition to the opening for receipt of a second fastener affixed to the one board for defining a predetermined maximum range of relative pivoting movement of the one board and the plate, and a second slot in relative disposition to the reference indicia for receipt of a third fastener affixed to the other of the abutted boards for attaching the plate to the other board and defining a predetermined maximum range of relative pivoting movement of the other board and the plate, whereby the boards may be respectively pivoted with respect to the plate for selective affixation at varying angles with respect to one another upon securement of the fasteners to clamp the plate to the pivoted boards.

2. A device for joining elongate boards according to claim 1 wherein the reference indicia is a notch formed in an edge of the plate.

3. A device for joining elongate boards according to claim 1 wherein the first slot is arcuate and is concentric with the opening.

4. A device for joining elongate boards according to claim 3 wherein the first slot extends approximately ninety degrees (90°).

5. A device for joining elongate boards according to claim 1 wherein the second slot is arcuate and is concentric with the reference indicia.

6. A device for joining elongate boards according to claim 5 wherein the second slot extends less than ninety degrees (90°).

7. A method of joining a pair of boards edge-to-edge at an angle with respect to one another without requiring mitered cutting of the adjoining boards, the method comprising the steps of:

providing a connecting plate having a reference indicia, a fastener receipt opening adjacent the reference indicia, a first slot disposed relative to the fastener receipt opening, and a second slot disposed relative to the reference indicia;

abutting the respective edges of the boards;

positioning the connecting plate in overlying relation to the abutted board edges with the reference indicia disposed at the abutment location, the fastener receipt opening and the first slot overlying one board, and the second slot overlying the other board;

affixing a first fastener to the one board through the fastener receipt opening for attaching the plate and the one board pivotably with respect to one another;

affixing a second fastener to the one board through the first slot for defining a predetermined maximum range of relative pivoting movement of the one board and the plate;

affixing a third fastener to the other board through the second slot for defining a predetermined maximum range of relative pivoting movement of the other board and the plate;

pivoting the abutted boards with respect to one another and to the plate into a desired angular disposition to each other; and securing the fasteners to clamp the plate to the pivoted boards to fix them in their desired pivoted disposition.

8. A method of joining elongate boards according to claim 7 wherein the step of affixing the second fastener comprises locating the second fastener at an end of the first slot most closely adjacent the abutted board edges and the step of affixing the third fastener comprises locating the third fastener at an end of the second slot most closely adjacent the abutted board edges.

* * * * *

UNITED STATES PATENT AND TRADEMARK OFFICE
CERTIFICATE OF CORRECTION

PATENT NO. : 5,274,902

DATED : January 4, 1994

INVENTOR(S) : John H. Rowley

It is certified that error appears in the above-identified patent and that said Letters Patent is hereby corrected as shown below:

Column 1, line 10, delete "on" and insert therefor -- one --.

Column 4, line 14, delete "32," and insert therefor -- 32' --.

Signed and Sealed this

Second Day of August, 1994

*Attest:*

BRUCE LEHMAN

*Attesting Officer*

*Commissioner of Patents and Trademarks*